(12) United States Patent
Matsuo et al.

(10) Patent No.: US 7,858,543 B2
(45) Date of Patent: Dec. 28, 2010

(54) RESIN JOINED BODY

(75) Inventors: Naoyuki Matsuo, Ibaraki (JP); Atsushi Hino, Ibaraki (JP); Masayuki Kaneto, Ibaraki (JP)

(73) Assignee: Nitto Denko Corporation, Ibaraski-shi, Osaka (JP)

( * ) Notice: Subject to any disclaimer, the term of this patent is extended or adjusted under 35 U.S.C. 154(b) by 32 days.

(21) Appl. No.: 11/834,353

(22) Filed: Aug. 6, 2007

(65) Prior Publication Data

US 2008/0085420 A1  Apr. 10, 2008

(30) Foreign Application Priority Data

Oct. 5, 2006 (JP) ............................. 2006-274169

(51) Int. Cl.
*B32B 5/26* (2006.01)

(52) U.S. Cl. ...................... 442/381; 156/73.1; 156/107; 428/474.7

(58) Field of Classification Search ................. 442/381; 428/474.7
See application file for complete search history.

(56) References Cited

U.S. PATENT DOCUMENTS

| | | | |
|---|---|---|---|
| 3,560,291 A | 2/1971 | Foglia et al. | |
| 6,038,700 A * | 3/2000 | Aldridge et al. | 2/81 |
| 2003/0150543 A1 | 8/2003 | Hartley et al. | |
| 2004/0038023 A1 | 2/2004 | Hartley et al. | |
| 2005/0003301 A1 | 1/2005 | Sugawara et al. | |
| 2005/0098260 A1 | 5/2005 | Chen | |
| 2005/0181168 A1* | 8/2005 | Barnes et al. | 428/57 |
| 2005/0191472 A1 | 9/2005 | Oonishi | |
| 2007/0184279 A1 | 8/2007 | Hartley et al. | |

FOREIGN PATENT DOCUMENTS

| AU | 2003203032 A1 | 7/2003 |
|---|---|---|
| CA | 2471876 A1 | 7/2003 |
| CN | 1616218 A | 5/2005 |
| CN | 1652928 A | 8/2005 |
| CN | 1660559 A | 8/2005 |
| DE | 1479686 A1 | 7/1969 |
| EP | 1472085 A1 | 11/2004 |

(Continued)

OTHER PUBLICATIONS

European Search Report dated Jan. 31, 2008, issued in corresponding European Patent Application No. 07252983.

*Primary Examiner*—Lynda Salvatore
(74) *Attorney, Agent, or Firm*—Westerman, Hattori, Daniels & Adrian, LLP

(57) ABSTRACT

In a resin joined body including at least one member made of a resin material that forms a first resin layer and a second resin layer, the at least one of the first and second resin layers having the rear side from which the laser beam has been irradiated has an absorption constant of 50 to 5000 m$^{-1}$ for the wavelength of the laser beam, and the fuse bonded portion is formed to have a relationship of X>Y, wherein a light transmittance of light passing from the first resin layer to the second resin layer via the fused portion is designated as X(%), and a light transmittance of light passing continuously from the first resin layer to the second resin layer via a portion other than the fused portion is designated as Y(%).

5 Claims, 2 Drawing Sheets

FOREIGN PATENT DOCUMENTS

| | | |
|---|---|---|
| EP | 1525972 A1 | 4/2005 |
| EP | 1568470 A2 | 8/2005 |
| GB | 1101762 A | 1/1968 |
| JP | 2004-195829 A | 7/2004 |
| JP | 2005-125783 A | 5/2005 |
| JP | 2005515086 A | 5/2005 |
| JP | 2005238751 A | 9/2005 |
| MX | PA04006798 A | 4/2005 |
| WO | WO 03/059619 A1 | 7/2003 |

\* cited by examiner

RESIN JOINED BODY

CROSS REFERENCE TO RELATED APPLICATION

This application claims priority from Japanese Patent Application No. 2006-274169, which is incorporated herein by reference.

BACKGROUND OF THE INVENTION

1. Field of the Invention

The present invention relates to a resin joined body, and more particularly to a resin joined body formed by fuse bonding by using a laser beam.

2. Discussion of the Background

Conventionally, there are broadly known various methods of fuse bonding resin members together as a method of joining members together. Among these methods, many methods include overlapping resin members made of a resin material together with the overlapped resin members held in surface-to-surface contact with each other and irradiating a laser beam onto the overlapped portion to fuse the surfaces of the resin material, thereby forming a fuse bonded portion.

For forming a resin joined body having the surfaces of the resin members fuse bonded together, infrared laser or near infrared laser is usually used.

Also, for forming a resin joined body, a substance having an absorption peak in the infrared portion or near infrared portion (hereinafter also referred to absorbent), such as carbon black and porphyrin dye, is disposed in the surface-to-surface contact portion of the resin members. This absorbent remains in this joined portion even after the formation of the resin joined body. Since the absorbent as mentioned above contains dye or the like, an absorbent remaining portion has a deteriorated aesthetic appearance having such as a lowered light transmittance than the other portion.

It is conceivable to reduce the amount of the absorbent in order to prevent deterioration of the aesthetic appearance such as lowering of the light transmittance, while increasing the irradiation energy of a laser beam. However, this may pose a problem. That is, when forming this conventional resin joined body, a laser beam is usually irradiated from a rear side of one resin member having its surface contacting the opposite resin member to the surface-to-surface contact portion. This laser beam passes through the resin members so that the laser beam is absorbed by the absorbent. In addition, although not to such an extent as the absorbent does, the resin members themselves also absorb the laser beam to some extent, and therefore the increase in irradiation energy of the laser beam causes heat developing on this rear side of this resin member. In some situations, the rear side may be fused.

[Patent Document 1] describes a method using a focused laser beam, as a method of forming a fuse bonded portion in a surface-to-surface contact portion by using such laser beam. In a method using this focused laser beam, a laser beam, which passes from the rear side towards the surface side, of a resin member, is converged so that the energy of the laser beam can be focused near the focal point of the focused laser beam, and therefore it is possible to form a fuse bonded portion while suppressing heat developing on the rear side of the resin member and reducing the number of times the absorbent is used.

However, merely the use of the focused laser beam makes it difficult to generate sufficient heat energy in the surface-to-surface contact portion of the resin members while at the same time satisfactorily suppressing the use of the absorbent.

That is, a conventional resin joined body that has a fuse bonded portion formed therein by the irradiation of a laser beam has a problem that the aesthetic appearance of the joined portion cannot be satisfactorily improved.

[Patent Document 1] Japanese Patent Application Laid-open No. 2004-195829

It is an object of the present invention to provide a resin joined body that has a joined portion with a satisfactorily improved aesthetic appearance.

SUMMARY OF THE INVENTION

As a result of intentional studies by the present inventors on a resin joined body formed by fuse bonding by using a laser beam, it was found that a heat energy required for fuse bonding can be securely generated in a fuse bonded portion by providing a resin member having a rear side, through which this focused laser beam is irradiated thereinto, with a predetermined absorption coefficient relative to the wavelength of the irradiated laser beam.

According to the present invention, there is provided a resin joined body that includes at least one member made of a resin material that forms a first resin layer and a second resin layer, the first resin layer and the second resin layer being held in surface-to-surface contact with each other to form a joined portion, the joined portion having a fuse bonded portion formed by fuse bonding of the resin material, wherein while the first resin layer and the second resin layer are held in surface-to-surface contact with each other, a laser beam is irradiated from a rear side of at least one of the first and second resin layers to the surface-to-surface contact portion, and the laser beam is irradiated so as to be focused during the traveling from the rear side to a front side of the at least one of the first and second resin layers so that the resin material on the front side is heat fused to form the fuse bonded portion, in which the at least one of the first and second resin layers having the rear side from which the laser beam has been irradiated has an absorption constant of 50 to 5000 $m^{-1}$ for the wavelength of the laser beam, and the fuse bonded portion is formed to have a relationship of X>Y, in which a light transmittance of light passing from the first resin layer to the second resin layer via the fuse bonded portion is designated as X(%), and a light transmittance of light passing continuously from the first resin layer to the second resin layer via a portion other than the fuse bonded portion is designated as Y(%).

By the absorption constant ($\alpha$:$m^{-1}$) is meant herein a value that can be defined by the Lambert-Beer's law (the following equation 1) from the natural logarithm of the ratio of the transmitted laser beam intensity (I) of a laser beam, which has transmitted through a resin member, relative to the incident laser beam intensity ($I_0$) of a laser beam, which has not yet transmitted through the resin member, and the thickness of this resin member (d: meter). For example, the thickness (d) of the resin member is measured by a micrometer or the like and the light transmittance ($I/I_0$) of the resin member for a laser beam is measured by a spectrophotometer or the like so that the absorption constant can be determined.

$$\alpha = -(1/d) \cdot \log(I/I_0) \quad (1)$$

By the light transmittance (%) is herein meant a light transmittance in a visible light region. The light transmittance in this visible light region can be determined by, for example, measuring the light transmittance of a resin member for a region of a wavelength of 400 to 800 nm by using a spectrophotometer and calculating the arithmetic average in this region.

The light transmittance (%) of light that passes continuously from the first resin layer to the second resin layer via a portion other than the fuse bonded portion can be determined by, for example, measuring the light transmittance (%) for a portion, in which the resin members are not fuse bonded together but merely held in surface-to-surface contact with each other.

According to the present invention, the laser beam is irradiated so as to be focused during the travel from the rear side to the front side of a resin member so that a resin material on the front side is heat fused to form the fuse bonded portion; and the resin member having the rear side from which the laser beam has been irradiated has an absorption constant of 50 to 5000 $m^{-1}$ for the wavelength of the laser beam. Whereby, it is possible to form the fuse bonded portion while suppressing heat developing on the rear side of the resin member and reducing the number of times the absorbent is used.

If a resin joined body has only a conventional structure, absorbent may remain in a fuse bonded portion or its periphery. The absorbent remaining portion has a lowered light transmittance than the portion in which the resin members are merely overlapped with each other, which results in deterioration in aesthetic appearance of the joined portion.

According to the present invention, the joined portion is formed in the fuse bonded portion so as to have the light transmittance (X(%)) of light which passes through the resin members via the fuse bonded portion being higher than the light transmittance (Y(%)) for the portion other than the fuse bonded portion (i.e., X>Y). Thus, it is possible to suppress the possibility that a fuse bonded portion having a lowered light transmittance than the other portion is formed, and suppress deterioration in aesthetic appearance compared with a conventional resin joined body. That is, it is possible to provide a resin joined body that has a joined portion with a satisfactorily improved aesthetic appearance.

BRIEF DESCRIPTION OF THE DRAWINGS

The above, and other objects, features and advantages of the present invention will become apparent from the detailed description thereof in conjunction with the accompanying drawings wherein.

DETAILED DESCRIPTION OF THE PREFERRED EMBODIMENT

An embodiment according to the present invention will be hereinafter described with reference to the drawings attached hereto.

Now, the description will be made for an example of a joining form of a resin member according to the present invention by taking, for example, a resin joined body, in which laminate sheets, each using nonwoven fabric of aramid fiber (hereinafter also referred to as aramid paper) that is processed into a sheet to be used as a surface member, are joined together.

Figure 1:
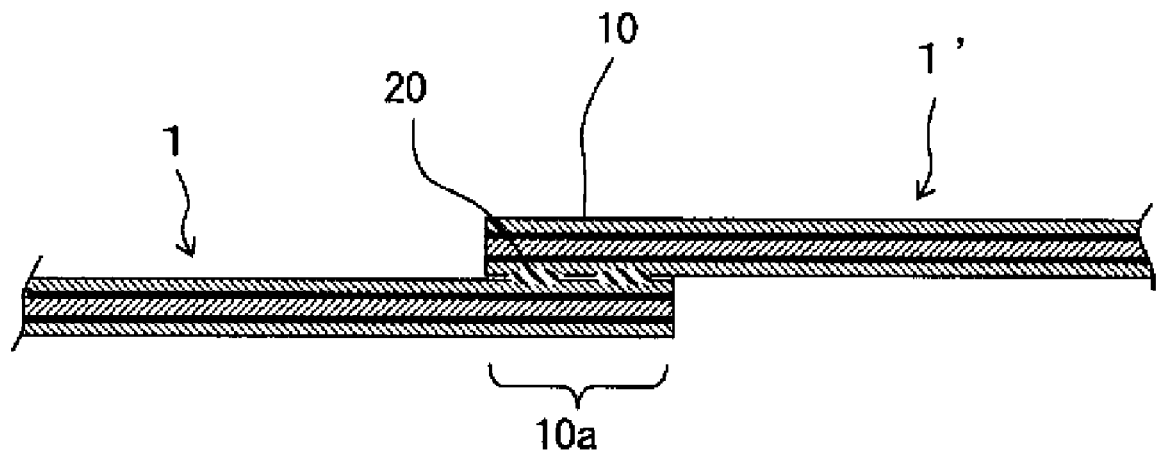
FIG. 1 is a cross sectional view illustrating a portion of a resin joined body of one embodiment of the present invention.

FIG. 1 is a cross sectional view illustrating a portion of a resin joined body of this embodiment, in which a reference numeral 1 represents a laminate sheet of the resin joined body. The resin joined body of this embodiment includes two laminate sheets, namely a first laminate sheet 1 that has nonwoven fabric of aramid fiber processed into a sheet (hereinafter also referred to aramid paper) used as a surface member, and a second laminate sheet 1' that has also aramid paper used as a surface member. The resin joined body of this embodiment has an overlapped portion 10a in which the two laminate sheets are overlapped with each other, and a joined portion 10 formed in this overlapped portion 10a, in which the first laminate sheet 1 and the second laminate sheet 1' are joined together.

This joined portion 10 is formed by holding the aramid papers as the surface members of the first laminate sheet 1 and the second laminate sheet 1' in contact with each other. These aramid papers are fused in a portion of this surface-to-surface contacting area so that the surfaces of the first laminate sheet 1 and the second laminate sheet 1' are fused together to form a fuse bonded portion 20.

This fuse bonded portion 20 is formed by a method using a laser beam which will be hereinafter described in detail, and is usually formed into a linear shape having a width of 100 μm or wider. The fuse bonding of this fuse bonded portion 20 is achieved only by heat fusing the aramid papers by irradiation of laser beam without using absorbent or the like.

This fuse bonded portion 20 is formed in the joined portion to have a value of the light transmittance of light passing through the fused aramid papers of the first and second aramid papers 1, 1' via the fuse bonded portion 20 being equal to or larger than a value of the light transmittance calculated from the light transmittance of light passing through a portion of the first laminate sheet 1 other than the fuse bonded portion 20 and the light transmittance of light passing through a portion of the second laminate sheet 1' other than the fuse bonded portion 20.

Specifically, the fuse bonded portion 20 is formed in the joined portion 10 to have a relationship of X>Y, in which the light transmittance of light passing from the aramid paper of the first laminate sheet 1 to the aramid paper of the second laminate sheet 1', both being fused together at the fuse bonded portion 20, is designated as X(%), and the light transmittance of light passing from the aramid paper of the first laminate sheet 1 to the aramid paper of the second laminate sheet 1' via a portion other than the fuse bonded portion 20 is designated as Y(%). Thus, the lowering in the light transmittance due to absorbent or the like remained is suppressed. More specifically, according to the resin joined body of this embodiment, the fuse bonded portion 20 is formed in the joined portion to have a relationship of $X \geq 1.2Y$.

When the light transmittance of the merely surface-to-surface contact portion of the aramid papers of the first and second laminate sheets is Y(%), the light transmittance (X(%)) of the fuse bonded portion could be equal to Y(%). However, the resin joined body of this embodiment has resin members joined together without using absorbent and has an excellent heat performance, and therefore an interface between the aramid papers is eliminated in the fuse bonded portion of the aramid papers. Therefore, the light transmittance (X(%)) of the fuse bonded portion is higher than the light transmittance (Y(%)) of light passing through a portion other than the fuse bonded portion. For example, even in observation of a cut plane of the fuse bonded portion 20 by a microscope at about 100 times magnification, the fuse bonded portion is formed with no air layer or the like observed in the thus formed fuse bonded portion 20, and with a light transmittance (X(%)) of light passing through the aramid papers of the first and second laminate sheets 1, 1' via the fuse bonded portion 20 having the interface eliminated therein being improved 1.2 times better than the light transmittance (Y(%)) of a portion other than the fuse bonded portion.

In a case where absorbent is used, the absorbent is easy to be decomposed and hence generate a decomposed gas, and such a generated gas causes air bubbles to be easily mixed in the interface of the fuse bonded portion. However, since the joining is made without using absorbent in this embodiment, mixing of air bubbles can be prevented. Since irregular reflection of light due to the air bubbles is suppressed, it is also possible to improve the light transmittance of light passing through the aramid papers of the first and second laminate sheets 1, 1' even via the fuse bonded portion 20. Therefore, it is possible to not only eliminate the possibility that absorbent remains in the fuse bonded portion, but also eliminate an interface in the joined portion and suppress mixing of air bubbles, so that it is possible to more securely improve the light transmittance (X(%)) of light passing through the fuse bonded portion to a value, which is more than 1.2 times of the theoretical light transmittance (Y(%)).

Figure 2:
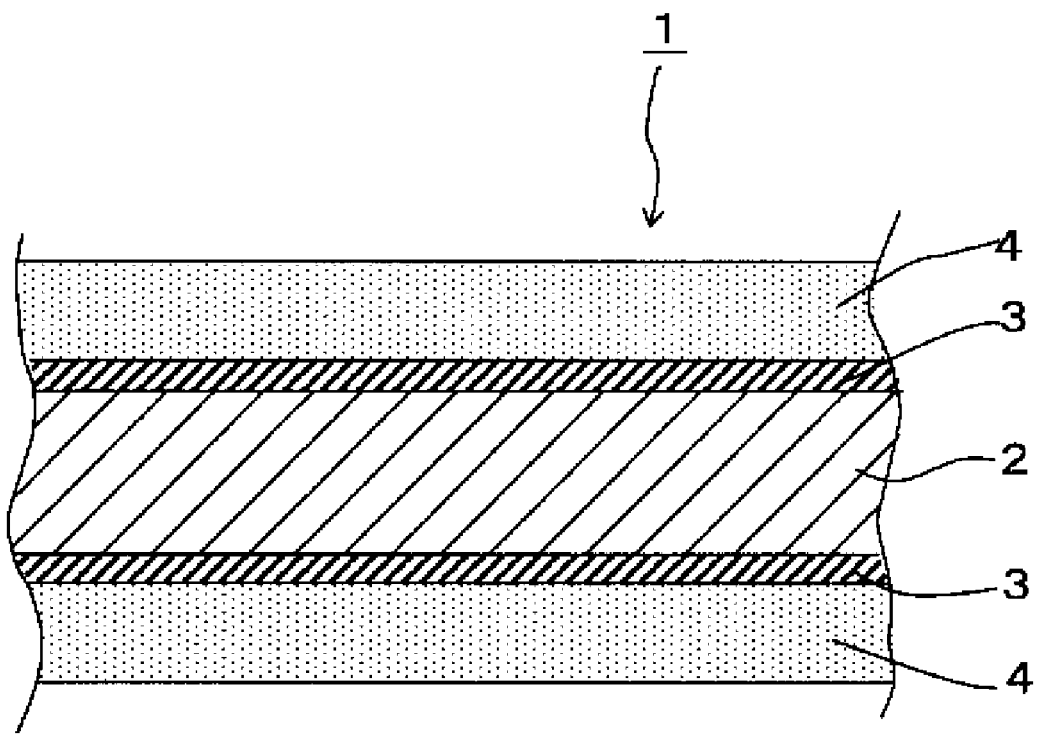
FIG. 2 is a cross sectional view illustrating the structure of a laminate sheet for use in a resin joined body.

The first and second laminate sheets 1, 1' have the same structure in this embodiment, and FIG. 2 illustrates a cross sectional view of this first laminate sheet 1 (second laminate sheet 1'). As illustrated in FIG. 2, the first laminate sheet 1 is made up of a film 2 using polyethylene naphthalate (hereinafter also referred to PEN), and aramid papers 4 disposed respectively on the front and rear sides of this PEN film 2, those three sheets being laminated together by adhesive 3.

It is not necessary to limit the thickness of each of those laminate sheets to a specific thickness, but a laminate sheet having a thickness of about 100 μm or greater and about 5 mm or smaller is usually preferably used. The aramid papers 4, which are used as members for forming the surfaces of each laminate sheet, each have an absorption constant of 50 to 5000 m$^{-1}$ for laser beam which is used to form a fuse bonded portion. The aramid papers each having an absorption constant of 50 to 5000 m$^{-1}$ are used for the reason that when the absorption constant is less than 50 m$^{-1}$, the light energy of a laser beam cannot be satisfactorily converted to the heat energy, and heat quantity required for fusing a surface side is difficult to be generated and thus the fuse bonding is difficult to be made; and when the absorption constant is more than 5000 m$^{-1}$, the light energy of a laser beam is converted to the heat energy on the surface side of each aramid paper before the laser beam reaches the surface, posing a problem of not only making the surface side difficult to be fused, but also causing fusion of the rear side depending on circumstances.

The thickness, basic weight (sheet weight per unit area) or the like of each aramid paper 4 may be varied depending on the wavelength of a laser beam to be used or the like. When a widely used infrared laser having a wavelength of 800 to 2000 nm is to be used, an aramid paper 4 having a thickness of 12 to 125 μm is usually usable. As the aramid paper 4, an aramid paper containing metha-type aramid fibers (e.g., NomexPaper made by DuPont) is especially preferable.

The PEN film 2 or the adhesive 3 is not necessarily limited to a specific material, but a material having an absorption constant smaller than that of the aramid paper 4 is preferably chosen.

Now, the description will be made for a laser beam irradiation device for use in forming the resin joined body.

As the laser beam irradiation device, for example, a device that can focus a laser beam having a wavelength of 800 to 2000 nm and irradiate the same is usable. Specifically, a laser beam irradiation device that can irradiate a laser beam having a circular cross section in a plain orthogonal to the laser beam irradiation direction, and that has a focal point on the front side of the laser beam irradiation direction and can irradiate a laser beam while decreasing the diameter of the circular cross section towards the focal point.

As an example of a means for focusing a laser beam, it can be cited a conventionally used means formed by such as lens, prism or mirror. Of them, it is preferable to use a means that can focus a laser beam with a numerical aperture (NA) represented by the following equation (2) being 0.2 or more in a medium having an index of refraction (η):

$$NA = \{r/(d^2+r^2)^{0.5}\} \quad (2)$$

where r is a ring radius of a ring-shaped laser beam on the laser beam emitting side, and d is a focal length. It is more preferable to use a means that can focus a laser beam with the above numerical aperture (NA) being 0.3 or more.

Figure 3:
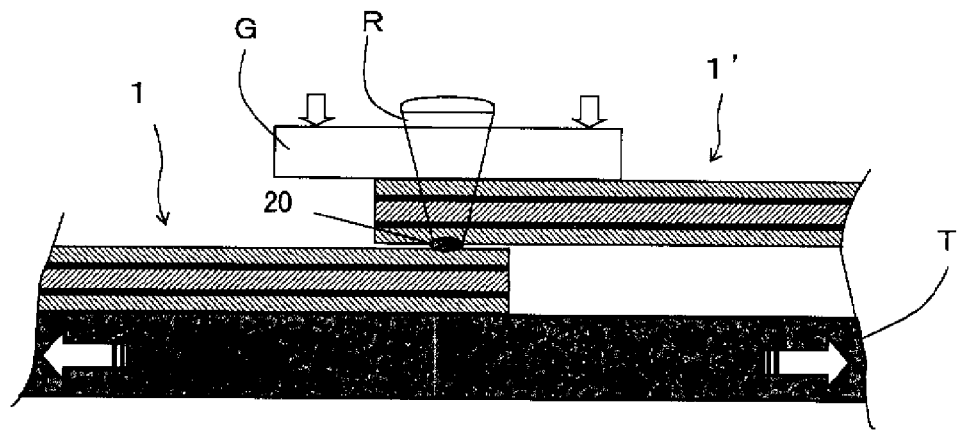
FIG. 3 is a schematic cross sectional view illustrating a step of forming or fuse bonding a resin joined body by a focused laser beam.

Now, the description will be made for a method of forming the above-explained resin joined body by using such a laser beam irradiation device, with reference to FIG. 3, a schematic cross sectional view illustrating a resin joined body which is being formed or fuse bonded by a focused laser beam.

First, a first laminate sheet 1 is placed on a table such as an XY table T that is movable in the plane direction, and then a second laminate sheet 1' is partially overlapped onto the first laminate sheet 1. Thus, the first laminate sheet 1 and the second laminate sheet 1' are set relative to each other at the positions corresponding to the required form of a resin joined body.

At this moment, since the first laminate sheet 1 and the second laminate sheet 1' each have the opposite surfaces provided respectively with aramid papers, the aramid papers are held in surface-to-surface contact with one another at an overlapped portion 10a.

Also, at this moment, the first laminate sheet 1 and the second laminate sheet 1' are overlapped without using absorbent, such as carbon black or porphyrin dye, in the surface-to-surface contact portion between the aramid papers.

Further, a glass substrate G is placed on this overlapped portion, and a pressure is applied through this glass substrate G onto the overlapped portion so as to fix the relative position between the first laminate sheet 1 and the second laminate sheet 1' and assure the fuse bonding upon the fusion of the surface of an aramid paper.

Then, a laser beam R is irradiated from above the glass substrate G onto the overlapped portion of the thus set first and second laminate sheets 1, 1'. At this moment, the focal point of the laser beam R is set slightly below an interface, at which the aramid papers are held in surface-to-surface contact, so as to allow the laser beam R to have a minute ring-shaped cross section at the surface-to-surface contact portion when the laser beam R is irradiated.

Specifically, the laser beam R is entered into the second laminate sheet 1' through the glass substrate G so as to be irradiated from the rear (upper) side of the aramid paper of the second laminate sheet 1', which is held in surface-to-surface contact with the aramid paper of the first laminate sheet 1, in the sheet thickness direction or towards the lower side, thereby heating and completing fuse bonding at the surface-to-surface contact portion. At the same time, the XY table T is operated to move an irradiated point of the overlapped portion in the XY direction, thereby forming a fuse bonded portion 20 in a predetermined area and in a predetermined pattern.

It is preferable that a laser beam is irradiated to have a numerical aperture of 0.2 or more, and an energy density of the laser beam in the minute ring-shaped area being 3000

W/cm² or more. It is possible to secure a broader fuse bonded area and therefore form a strongly joined portion by the irradiation of a laser beam in the above manner. From these points of view, the energy density of a laser beam at the interface, at which the aramid papers are held in surface-to-surface contact with each other, is preferably 4000 W/cm² or more and more preferably 5000 W/cm² or more.

In a case where members or materials for forming the surfaces of the first laminate sheet 1 and the second laminate sheet 1' for use in forming the resin joined body of this embodiment are all aramid papers, it is presumable that spaces appropriately formed between fibers in each aramid paper allow an emitted laser beam to be reflected multiple times through those clearances, and hence the heating efficiency at the surface-to-surface contact portion can be enhanced. In addition, the spaces of each aramid paper make the heat hard to transmit not only in the thickness direction but also in the plane direction, and suppress the heat quantity generated by the irradiation of a laser beam from being dissipated to the periphery, so that the generated heat can be efficiently utilized in the temperature rise of a laser beam irradiated portion. These effects can be achieved not only by an aramid paper but also any materials or members as long as they provide a nonwoven fabric shape for a portion to be fused.

An aramid paper used in this embodiment generally has a fusing point of 400° C. or higher, and is difficult to be fuse bonded unless absorbent is used also by a conventional method using an unfocused laser beam or the like, since fusion and decomposition take place simultaneously. Thus, by employing this aramid paper as a member or material to be fuse bonded for describing the present invention, the feature of the present invention becomes significant. However, the use of an aramid paper for a member or material of a resin joined body is not essential in the present invention.

This embodiment was described by taking, for example, a case where the same material is used for the members to be fused together. However, it is within the scope of the present invention that the members of different materials are joined together.

In a case where different materials are used for the members to be joined together and they are fuse bonded by a focused laser beam, a distinguished interface is not formed in the fuse bonded portion so that it is easy to form a fuse bonded portion, in which the material of the fuse bonded portion is gradually changed from one material to another material in a direction along which the members are overlapped with each other.

Thus, it is possible to not only form a strongly fuse bonded portion, but also suppress an interface from being clearly visually recognized, thus allowing the fuse bonded portion to have an appearance perceived as an originally integrated portion. Accordingly, it is expectable to provide an improved aesthetic appearance.

It is to be noted that although the laminate sheets as resin layers of the present invention are described in this embodiment as being formed independently of each other, a single laminate sheet may be used, in which it is folded into two to have two laminate sheet portions. For the convenience in description of the present invention, the resin layers of the present invention was described herein as independent laminate sheets.

EXAMPLES

Now, the description will be made for the present invention with reference to the following examples without intention to limit the present invention thereto.

Example 1

A resin joined body of Example 1 was manufactured by using the following laser beam irradiation device.

(Laser Beam Irradiation Device Used in this Example)
Laser source: Semiconductor laser
Laser wavelength: 1490 nm
Maximum output: 15 W Two laminate sheets each having the following structure were used for manufacturing the resin joined body.

(Structure of a Laminate Sheet)
Five-layer structure of "aramid paper/adhesive/PEN film/adhesive/aramid paper"

The absorption constant of 1490 nm for the material and the thickness, of the respective layers was measured by using a spectrophotometer (trade name LAMBDA-9, manufactured by PerkinElmer). The results are shown below.

Aramid paper: (trade name NOMEXPAPER, manufactured by DuPont (thickness: 55 μm), absorption constant: 1081 m$^{-1}$)

Adhesive: (acrylic adhesive (thickness: 30 μm), absorption constant: 360 m$^{-1}$)

PEN film: (thickness: 125 μm, absorption constant: 94 m$^{-1}$)

The absorption constant of the laminate sheet as a whole when measured in the same manner as above was 783 m$^{-1}$.

These laminate sheets are overlapped with each other, and a glass substrate, in which an absorption constant for a laser beam of 1490 nm is sufficiently smaller than the laminate sheets, is placed thereon. Then, the glass substrate was pressed downward at a pressure of 8 bar, while at the same time irradiating a laser beam thereto. At this moment, the distance from an objective lens of the laser beam to the interface at which the laminate sheets are held in surface contact with each other (surface-to-surface contact interface) was 25 mm and a laser beam was irradiated with a numerical aperture of 0.35 and a power of 14.1 W in a setting allowing the laser beam to be irradiated in a ring shape having a diameter of 280 μm on the surface-to-surface contact interface of the laminate sheets.

While the laser beam was being irradiated, the irradiation position was moved at a speed of 260 mm/min. Thus, an area over a distance of about 10 mm was fuse bonded. As a result of the cross-section observation, it was confirmed that a fuse bonded portion having a width of about 300 μm was formed. The shear strength of this resin joined body as measured was about 90 N. The strength per unit area was determined by calculation from an area of the fuse bonded portion (300 μm×10 mm) and found to be about 3 kN/cm². Thus, it was found that an excellent joining strength was obtained.

(Measured Result of the Light Transmittance)

The light transmittance was measured for each of a single laminate sheet, a fuse bonded portion in which the two laminate sheets were fused together, and a portion other than the fuse bonded portion, used in the resin joined body of Example 1. For the measurement of the light transmittance, a visible and near-infra-red spectrophotometer (type name V-670, manufactured by Jusco,) was used. The light transmittance was measured for a region of 400 to 800 nm by the visible and near-infra-red spectrophotometer, and the arithmetic average of this region was calculated. The result is shown in Table 1.

TABLE 1

| TEST PIECES | LIGHT TRANSMITTANCE (%) |
|---|---|
| SINGLE LAMINATE SHEET | 35.30 |
| TWO LAMINATE SHEETS (IN A FUSE BONDED PORTION) | 25.22 |
| TWO LAMINATE SHEETS (IN A PORTION OTHER THAN THE FUSE BONDED PORTION) | 16.97 |

From the measured result of Table 1, it is found that the fuse bonded portion is formed to have a light transmittance about 1.5 times higher than the other portion.

(Cross-Section Observation)

Figure 4:
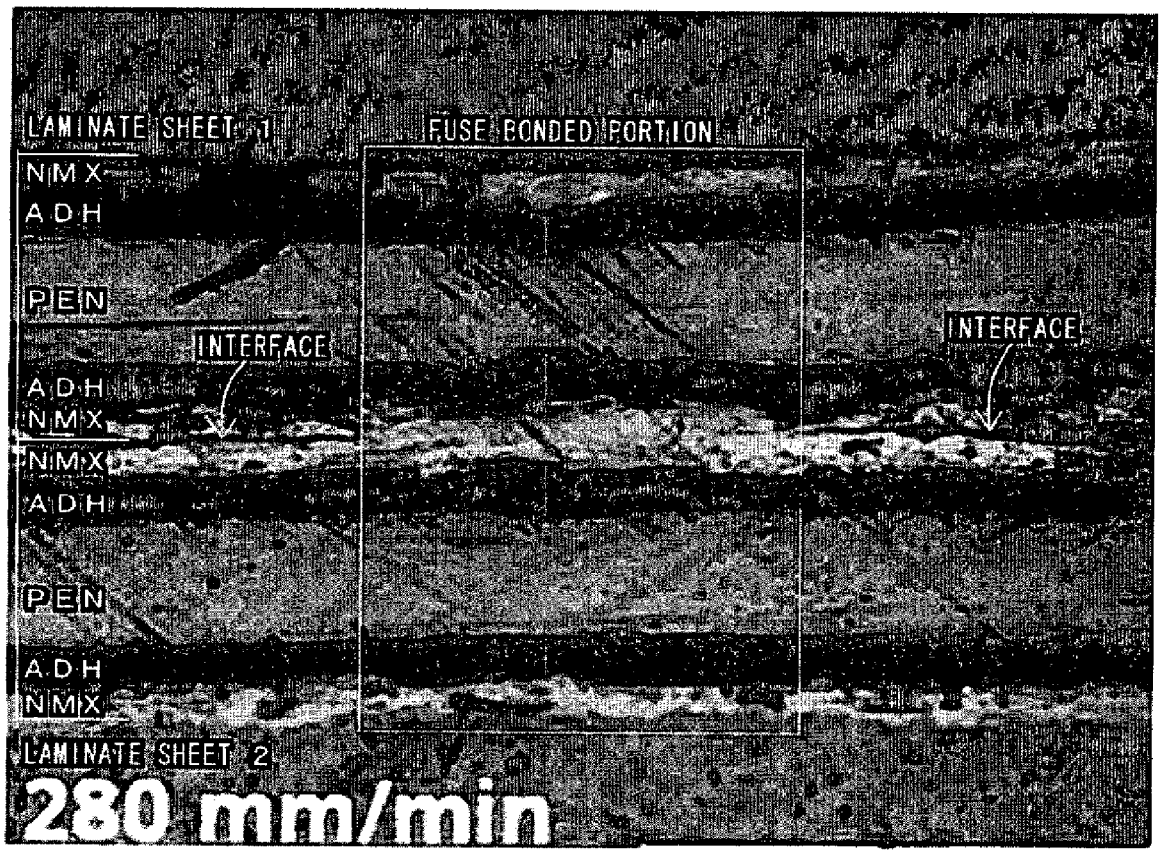
FIG. 4 is an SEM photograph illustrating a resin joined body of Example 1 in cross section.

FIG. 4 illustrates a fuse bonded portion and its periphery in cross section, of the resin joined body of Example 1, which was observed by a scanning electron microscope (SEM). The resin joined body as illustrated in FIG. 4 has two laminate sheets laminated together, each having a five-layer structure of "aramid paper/adhesive/PEN film/adhesive/aramid paper". In FIG. 4, "NMX" represents an "aramid paper", "ADH" represents "adhesive", and "PEN" represents "PEN film". A center portion of a photograph of FIG. 4 illustrates that an area (fuse bonded portion) with an interface between the upper laminate sheet and the lower laminate sheet eliminated has been formed, and it is found that this elimination of the interface contributes to the improvement of the light transmittance of the fuse bonded portion.

Example 2

A resin joined body was manufactured in the same manner as Example 1, except that the resin joined body was formed by laminate sheets each using an aramid paper having a thickness of 100 μm.

The shear strength of this resin joined body as measured was about 20 N (667 N/cm$^2$), and it was found that an excellent joining strength was obtained.

This specification is by no means intended to restrict the present invention to the preferred embodiments set forth therein. Various modifications to the resin joined body, as described herein, may be made by those skilled in the art without departing from the spirit and scope of the present invention as defined in the appended claims.

What is claimed is:

1. A resin joined body comprising:
    at least one member comprising a first resin layer and a second resin layer wherein at least one of the first resin layer and the second resin layer is a nonwoven fabric formed of aramid fiber,
    said first resin layer and said second resin layer being held in surface-to-surface contact with each other to form a joined portion,
    said joined portion having a fuse bonded portion formed by fuse bonding of the resin material,
    wherein the resin joined body is obtained by holding the first resin layer and the second resin layer in surface-to-surface contact with each other, irradiating a laser beam from a rear side of at least one of the first and second resin layers to said surface-to-surface contact portion, and irradiating the laser beam so as to be focused during the travelling from said rear side to a front side of said at least one of the first and second resin layers so that the resin material on the front side is heat fused to form said fuse bonded portion,
    wherein said at least one of the first and second resin layers having the rear side from which the laser beam has been irradiated has an absorption constant of 50 to 5000 m$^{-1}$ for the wavelength of the laser beam, and
    the fuse bonded portion is formed to have a relationship of X>Y, wherein a light transmittance of light passing from the first resin layer to the second resin layer via the fused portion is designated as X(%), and a light transmittance of light passing continuously from the first resin layer to the second resin layer via a portion other than the fused portion is designated as Y(%).

2. The resin joined body according to claim 1, wherein the fuse bonded portion is formed to have a value of the X and a value of the Y satisfying a relationship of X>1.2Y.

3. The resin joined body according to claim 1, wherein the fuse bonded portion is formed between the first resin layer and the second resin layer and
    wherein an interface between the first resin layer and the second resin layer is eliminated.

4. The resin joined body according to claim 1, wherein said nonwoven fabric is a sheet.

5. The resin joined body according to claim 3, wherein said nonwoven fabric is a sheet.

* * * * *